United States Patent [19]

Ziolkowski

[11] Patent Number: 4,685,543
[45] Date of Patent: Aug. 11, 1987

[54] SUPPORT PLATE FOR A FRICTION LINING OF A DISC BRAKE

[75] Inventor: Jürgen Ziolkowski, Reinbek, Fed. Rep. of Germany

[73] Assignee: Jurid Werke, Fed. Rep. of Germany

[21] Appl. No.: 865,634

[22] Filed: May 14, 1986

Related U.S. Application Data

[63] Continuation of Ser. No. 717,466, Mar. 27, 1985, abandoned, which is a continuation-in-part of Ser. No. 462,294, Jan. 31, 1983, abandoned.

[51] Int. Cl.$^4$ .................... F16D 65/00; F16D 65/78; F16D 69/00
[52] U.S. Cl. .................. 188/73.1; 188/250 E; 188/264 A; 188/264 G
[58] Field of Search ............ 188/73.1, 73.2, 218 XL, 188/250 B, 250 F, 251 M, 264 A, 73.37, 250 E, 253, 261, 71.6, 73.45; 192/70.14, 107 M, 107 T; D12/180

[56] References Cited

U.S. PATENT DOCUMENTS

| 3,477,551 | 11/1969 | Beuchle et al. | 188/250 B |
|---|---|---|---|
| 3,500,967 | 3/1970 | Nolan | 188/250 B |
| 3,563,347 | 2/1971 | Hamm | 188/73.1 |
| 3,848,708 | 11/1974 | Noguchi | 188/73.1 |
| 3,958,667 | 5/1976 | de Gennes | 188/73.1 |
| 4,166,521 | 9/1979 | Okunismi et al. | 188/251 M |
| 4,230,237 | 10/1980 | Stahl | 188/73.1 |

FOREIGN PATENT DOCUMENTS

| 2024103 | 11/1971 | Fed. Rep. of Germany | 188/73.1 |
|---|---|---|---|
| 0160437 | 12/1981 | Japan | 188/73.1 |

Primary Examiner—Andres Kashnikow
Assistant Examiner—Robert J. Oberleitner
Attorney, Agent, or Firm—Leo H. McCormick, Jr.; Ken C. Decker

[57] ABSTRACT

A backing plate (10, 10a) for supporting a friction lining in a disc brake assembly. The backing plate (10, 10a) is made of a thin sheet of corrosion resistant metal that has a recessed portion extending from a substantially rectangular base. The base has fixing brackets located on the top thereof with tabs which engage pins on the disc brake assembly. The recessed portion which is offset from the center of the rectangular base has a substantially circular shape that corresponds to an actuation piston of the disc brake assembly. The friction lining which engages the rectangular base has an additional thermal barrier located in the recessed portion. When the friction lining engages a rotor in the disc brake assembly, thermal energy is created. The thermal energy is carried through the friction lining to the backing plate; however, the thermal barrier substantially eliminates the direct flow of thermal energy to the actuation piston. In addition, the offset portion also reduces the production of noise associated with a brake application.

4 Claims, 22 Drawing Figures

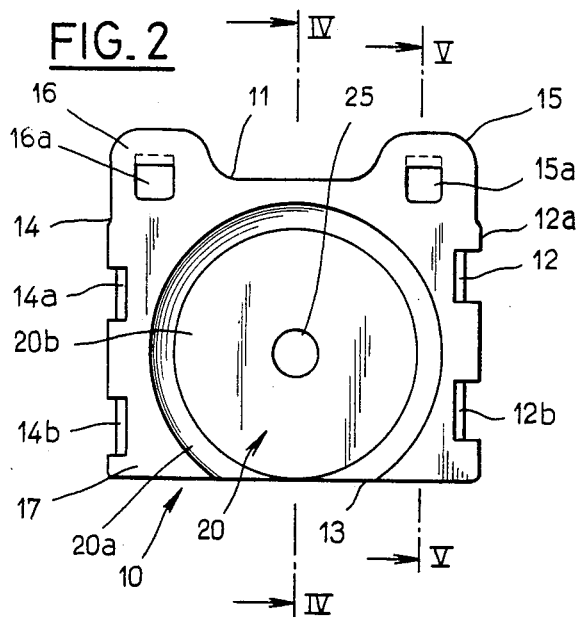
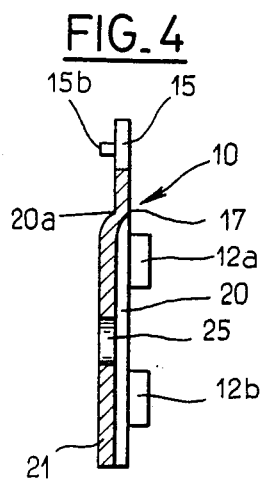
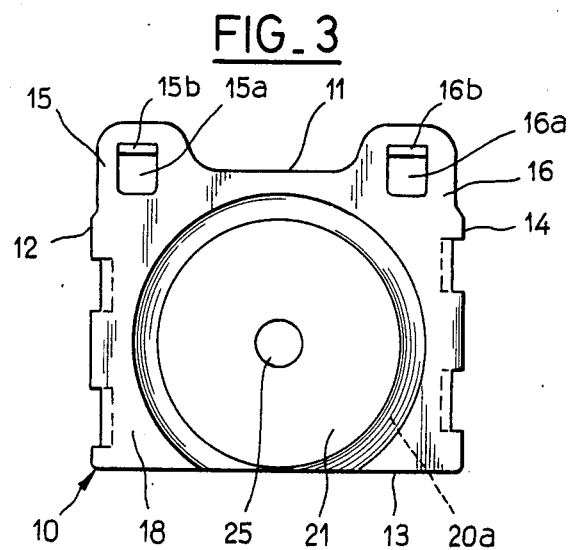
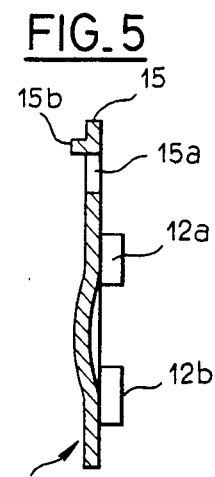
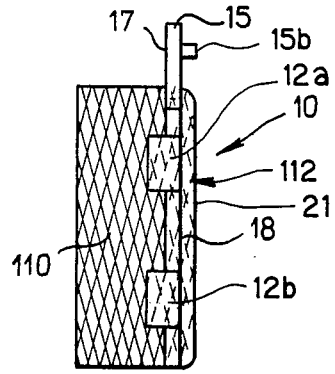

FIG. 13
FIG. 14
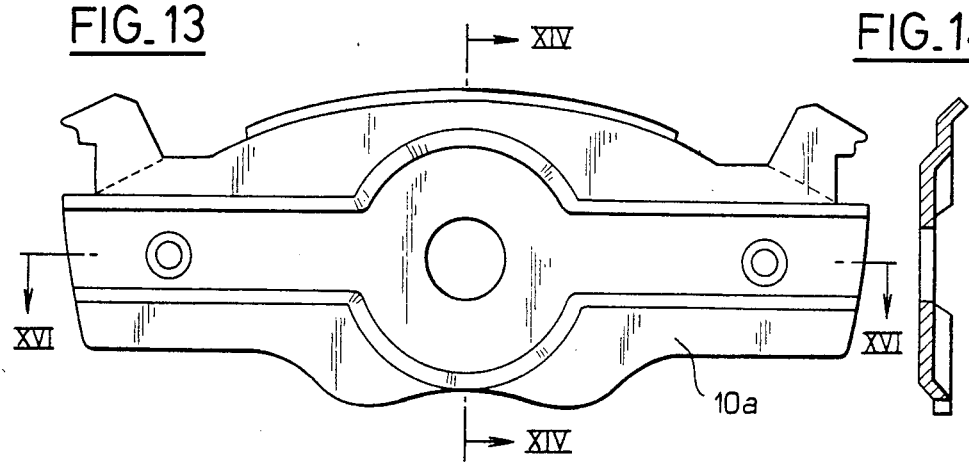
FIG. 15
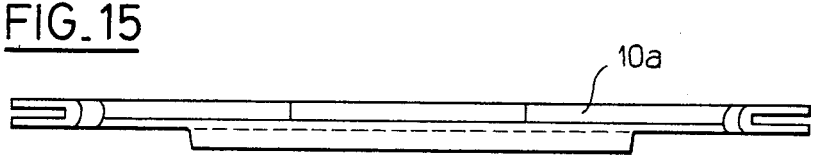
FIG. 16
FIG. 17
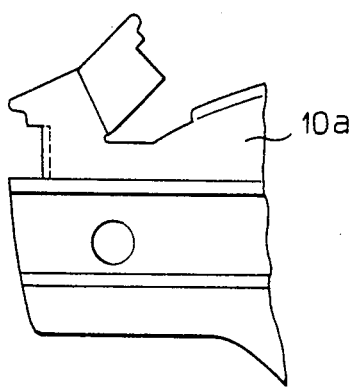
FIG. 18
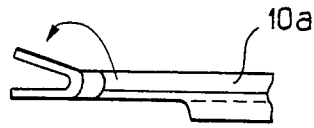

SUPPORT PLATE FOR A FRICTION LINING OF A DISC BRAKE

This is a continuation of abandoned application Ser. No. 717,466, filed 3-27-85, which is a continuation-in-part of abandoned application Ser. No. 462,294, filed 1-31-83.

The invention relates to a support plate for a friction lining of a disc brake. The friction lining of each held in the advancing area of the piston of a corresponding brake cylinder by a related support plate which cooperates with pins that interconnect an inner half caliper with and an outer half caliper of a brake cylinder.

Installation and mounting of friction linings of disc brakes are achieved, in a manner known in the art, by support plates arranged in the advancing path of the piston of the brake cylinders. Such friction linings are in the form of blocks of friction material which are attached to the support plates. The support plate are held by pins interconnecting the inner and outer half-caliper of the disc brake. Each of the calipers has a piston or a brake cylinder located therein.

The support plates for the friction linings are generally obtained from relatively thick sheets of a corrodable metal which rust or oxidize under the effect of moisture and of defrosting salts spread on the road during the winter.

Known support plates for the friction linings are generally coated with a layer of noise-reducing paint or lacquer. A coating of the brake pad with such a noise-reducing coat layer necessitates an additional manufacturing step and involves increase manufacturing costs for the brake pad.

It is an object of this invention to provide a support plate for a friction lining of a disc brake which reduces manufacturing costs and permits a convenient heat dissipation which results an increased serviceable life while further exhibiting reduced anti-noise properties.

In order to meet these objects and others, according to the invention, there is provided a support plate for a friction lining which has a generally substantially rectangular shape. The support plate is made out of a relatively thin metal sheet and has in the area of application and fixation of the friction lining, at least one recessed portion offset in the direction towards the corresponding brake cylinder piston.

According to another feature of the invention, an offset recessed portion of a rectangular backing plate has a substantially circular shape with a peripheral wall portion interconnecting the bottom of the recessed portion and a face of the support plate directed towards the friction lining extending along a slight angle to establish an air gap between the backing plate and the friction lining which reduces the transfer of thermal energy to the backing plate.

Despite the relatively reduced thickness of the sheet constituting the support plate, the latter offers, by reason of the offset recessed portion an improved intrinsic rigidity meeting all requirements for a braking pad support plate. Additionally, the recessed offset portion permits a better fixation of the friction lining onto the support plate since the recessed offset portion has additional retaining means. Fixation of the friction lining onto the corresponding surfaces of the support plate is achieved by any conventional means such as bonding by an adhesive.

The support plate can be advantageously made out of a non-corrodable material. Due to the stamped recessed configuration of the support plate, the support plate not only has an increased intrinsic rigidity but also an increased bending strength. Since the support plate can be made of a relatively thin metal sheet, the manufacturing costs should be reduced.

Due to the recessed offset portion, the support plate has a larger outer surface which allows a better heat dissipation. The risks of heat accumulation are suppressed since heat can be easily dissipated into the surrounding air.

Further, it has been found that with such an arrangement, by reason of the particular shaping of the support plate the support plate exhibits a reduced noise tendency and an improved serviceable life.

Other objects and advantages of the invention should be evident from the following description, made in reference with appended drawings, wherein:

FIG. 2 is a front view of a support plate according to the invention showing the side of application of the friction lining;

FIG. 3 is an opposite front view of said support plate;

FIG. 4 is a cross-section along line IV—IV of FIG. 2;

FIG. 5 is a cross-section along line V—V of FIG. 2;

FIG. 6 is an end view of the support plate of FIGS. 2 to 5 equipped with its friction lining;

FIG. 13 is a front view of another embodiment of a support plate according to the invention, for a divided friction lining;

FIG. 14 is a cross-section along line XIV—XIV of FIG. 13;

FIG. 15 is a top view of the support plate of FIG. 13;

FIG. 16 is a longitudinal cross-section along line XVI—XVI of FIG. 13;

FIG. 17 is a partial view of the end of the support plate according to FIG. 13 including a folded holding ear before folding of the outer ear half;

FIG. 18 is a top view of the end of the support plate of FIG. 17 with outer ear half folded;

Figure 1:
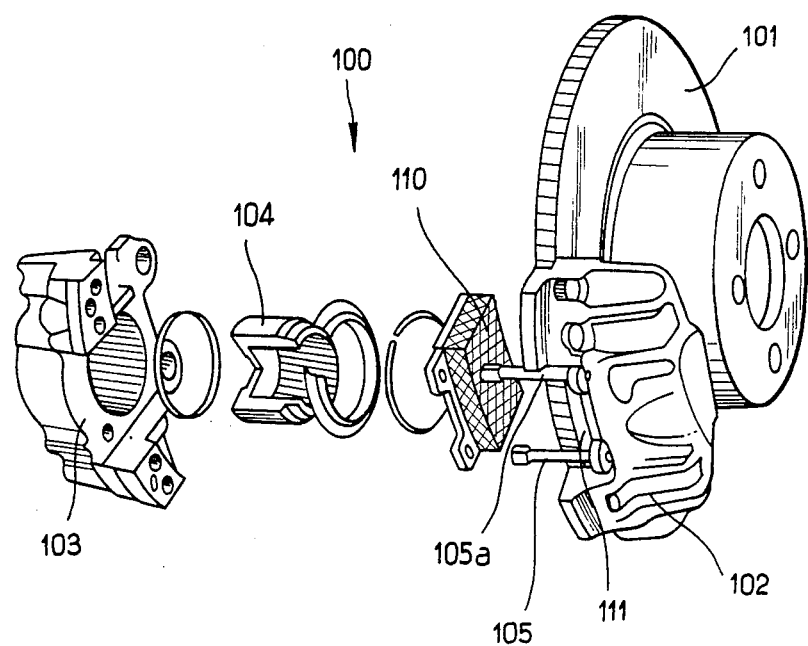
FIG. 1 is an exploded view of a disc brake embodying two brake pads according to the invention.
Figure 7:
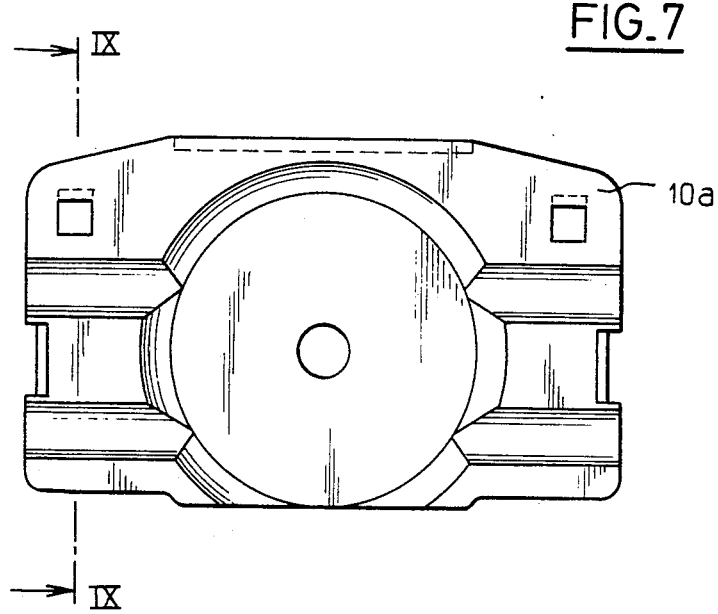
FIG. 7 is a front view of another embodiment of the support plate according to the invention.
Figure 8:
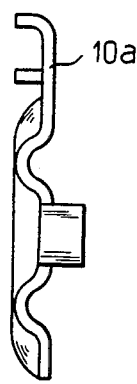
FIG. 8 is an end view of the support plate of FIG. 7.
Figure 9:
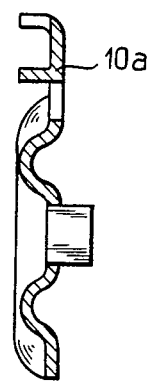
FIG. 9 is a cross-section along line IX—IX of FIG. 7.
Figure 10:
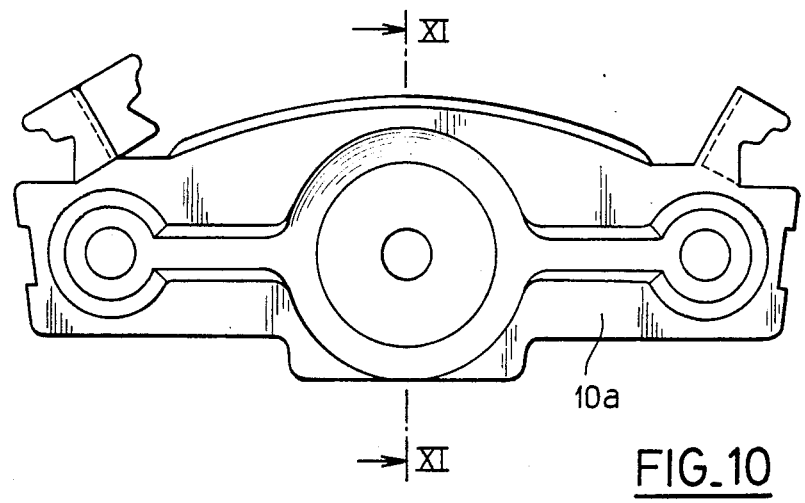
FIG. 10 is a front view of another embodiment of a support plate of the invention for a divided or contoured friction lining.
Figure 11:
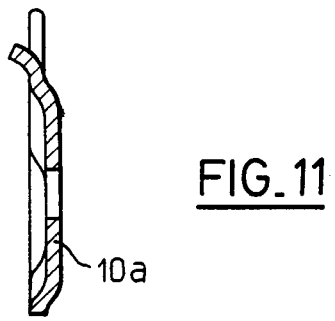
FIG. 11 is a cross-section along line XI—XI of FIG. 10.
Figure 12:
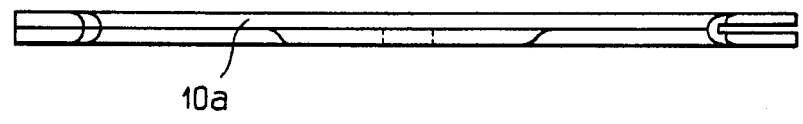
FIG. 12 is a top view of the support plate of FIG. 10.
Figure 19:
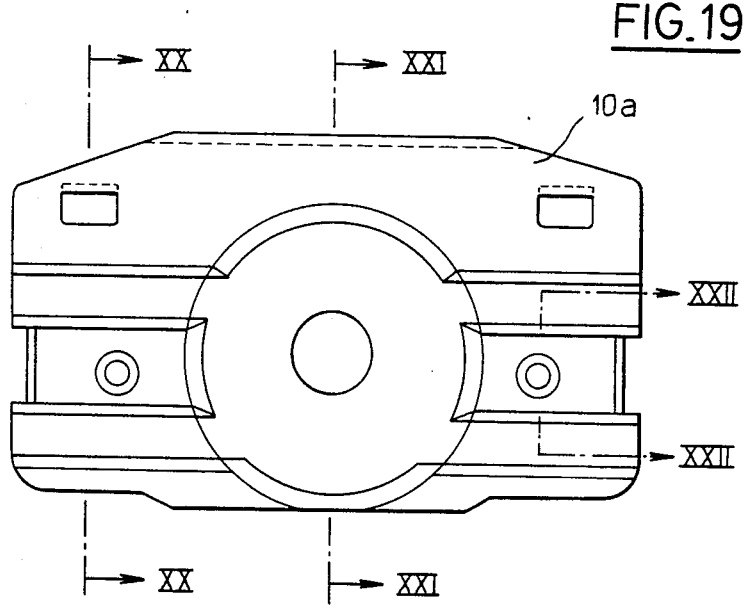
FIG. 19 is a front view of still another embodiment of a support plate according to the invention for a divided friction lining.
Figure 20:
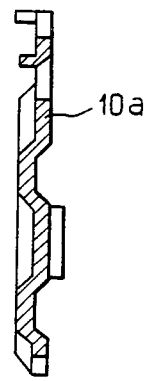
FIG. 20 is a cross-section along line XX—XX of FIG. 19.
Figure 21:
FIG. 21 is a cross-section along line XXI—XXI of FIG. 19.
Figure 22:
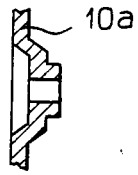
FIG. 22 is a partial cross-section along line XXII—XXII of FIG. 19.

There is illustrated in FIG. 1 a disc brake, generally designated by reference 100, which comprises a disc or rotor 101, an inner half-caliper 102 including a brake cylinder, an outer half-caliper 103 including a brake cylinder, and friction linings 110, 111 positioned on both sides of the disc or rotor 101 by means of their respective support plates cooperating with holding pins 105, 105a which interconnects the two caliper halves 102, 103. The piston of the brake cylinder of inner half caliper 103 is shown at 104. The friction linings 110 and 111 are each in the form of a block of friction materials fixed onto the related support plate by means of an adhesive bonding or any other convenient fixation means.

Referring now to FIGS. 2 and 3, there is shown a support plate according to the invention, generally designated by reference numeral 10, made from a metal sheet of relatively thin thickness and having a substantially rectangular outer shape with peripheral sides 11, 12, 13 and 14. On its upper peripheral side 11, the plate is formed with ears 15 and 16. Each ear 15 and 16 has a transversing hole 15a, 16a, respectively typically of rectangular shape, holes 15 and 16 locate the support plate 10 on holding pins 105, 105a.

In the area of application and fixation of the friction lining 110 (FIG. 6), the support plate 10 is formed with a stamped recessed offset portion 21 arranged in such a manner that the bottom offset area 21 is located on the advancing travelling path of the associated brake cylinder piston 104 for abuttingly cooperating with said latter when the support plate 10 is mounted on holding pins 105, 105a attached to the half calipers 102 and 103.

In the embodiment illustrated in FIGS. 2 and 3, the recessed offset portion 20 of the support plate 10 has a substantially circular or cylindrical shape, although other shapes may be contemplated. The peripheral wall portions 20a interconnecting the offset bottom portion 21 and the inner flat surface 17 of the plate extends along a slight angle with respect to said latter (FIG. 4). The offset bottom portion 21 can be provided centrally with a transversing hole 25 which serves as an inspection hole for controlling the adhesive layer for bonding the friction lining 110 onto the support plate 10.

The holding ears 15 and 16, each have a backwardly folded tab 15b, 16b delimitating upwardly from the openings 15a, 16a and integral with the material of the support plate 10. The tabs 15b, 16b help in aligning of the brake pad 10 with respect to disc or rotor 101.

The support plate 10 is formed out of a corrosion-resistant material, typically out of stainless steel. Adjacent its lateral opposite edges 12, 14 the support plate 10 also has tabs 12a, 12b and 14a, 14b, respectively, which are folded inwardly at a right angle with respect to the inner surface 17 of the support plate. Tabs 12a, 12b and 14a, 14b aid in holding the friction lining bonded onto the inner surface 17 of the support plate 10. Tabs 12a, 12b and 14a, 14b absorb a portion of the lateral shearing forces in the friction lining 110 and to therefore contribute to better and of higher serviceable life connection between the friction lining 110 and the support plate 10. A thermal barrier 112 shown in FIG. 6 reduces the transfer of thermal energy produced during a brake application from adversely effecting the operation of piston 104. Thus, the disc brake assembly 100 can operate for a greater length of time under adverse operating conditions and yet maintain the same braking parameters.

FIGS. 7 to 22 shown different alternative embodiments of a support plate 10a according to the invention for divided or contoured friction linings made of adjacent friction lining portions bonded to a common support plate. As in the preceding embodiment, said support plate 10a in the bonding area of the friction lining 120, 122, 124, 126 and 128 recessed offset portions, at least one of which (central area) 120 being of circular shape, the different recessed offset portions (including longitudinally extending rib or channel portions) interconnecting preferably one with each other. In the embodiment of FIGS. 10 to 18, the support plates 11a cooperate with the holding pins by means of correspondingly shaped upwardly outwardly extending ears, preferably of the double-folding type. In the embodiment of FIGS. 19 to 22, the support plates also include lateral retaining tabs as described in connection with the first embodiment.

We claim:

1. A backing plate for a friction lining of a disc brake assembly, said backing plate having a substantially rectangular shape with fixing brackets formed on an upper rim, said friction lining on engagement with another member during a brake application generating thermal energy and creating vibrations, said backing plate being characterized by a base member with substantially constant thin wall thickness, said base member having a crimped recessed portion with a circular shape, said recessed portion being offset from said base member, said friction lining being located in said recessed portion and aligned therein by tabs that extend from at least first and second sides of the base member, said disc brake assembly having an actuation member that engages said recessed portion to effect a brake application, said recessed portion holding said base member from said actuation member to define an air gap therebetween, said friction lining conducting heat produced during said brake application to said backing plate, said air gap dispersing a substantial portion of said heat prior to the heat being conducted to said recessed portion to reduce the transfer to thermal energy from the friction lining to the actuation member which would adversely effect the operation thereof while said circular shape of the recessed portion absorbs vibrations to reduce the development of noise during a brake application.

2. The backing plate as recited in claim 1 wherein said fixing brackets further include ears that engage pins of said disc brake assembly to maintain said recessed portion in alignment with said actuation member.

3. The backing plate, as recited in claim 2, wherein said backing plate is a corrosion-resistant material.

4. A support plate for a friction lining used in a disc brake assembly, said support plate holding said friction lining in alignment with a brake cylinder piston by holding pins, said holding pins connecting a flange housing with a brake cylinder and a cover housing with a brake cylinder, said support plate being rectangular in shape and having a single recessed area therein for receiving said friction lining, said recess area being in axial alignment with said brake cylinder piston, said recess having a circular cross section, the improvement in the support plate comprising:

a base member formed from a thin wall metal sheet, said base member being crimped to define said recessed area, said recessed area being connected to said base member by a sloped transition area, said base member having two holding ears adjacent openings through which said pins are located, said holding ears aiding in guiding said support plate on movement of said friction linings by said brake cylinder piston, said sloped transition area absorbing vibrations created during a brake application to reduce the development of noise while said recessed area holds said base member away from said brake cylinder piston to define an air gap therebetween, said air gap forming a thermal barrier to reduce the transfer of thermal energy produced during a brake application from adversely effecting the operation of said brake cylinder piston.

* * * * *